(12) United States Patent
Lewis

(10) Patent No.: US 10,838,504 B2
(45) Date of Patent: Nov. 17, 2020

(54) GLASS MOUSE

(71) Applicant: Stephen H. Lewis, New York, NY (US)

(72) Inventor: Stephen H. Lewis, New York, NY (US)

(*) Notice: Subject to any disclaimer, the term of this patent is extended or adjusted under 35 U.S.C. 154(b) by 67 days.

(21) Appl. No.: 15/617,811

(22) Filed: Jun. 8, 2017

(65) Prior Publication Data

US 2017/0357330 A1    Dec. 14, 2017

Related U.S. Application Data

(60) Provisional application No. 62/347,206, filed on Jun. 8, 2016.

(51) Int. Cl.
| | |
|---|---|
| *G06F 3/03* | (2006.01) |
| *G06F 3/01* | (2006.01) |
| *G06Q 30/06* | (2012.01) |
| *G06F 3/042* | (2006.01) |
| *G06F 3/0488* | (2013.01) |

(52) U.S. Cl.
CPC ............ *G06F 3/017* (2013.01); *G06F 3/0304* (2013.01); *G06F 3/042* (2013.01); *G06F 3/04883* (2013.01); *G06Q 30/0601* (2013.01); *G06F 2203/0339* (2013.01)

(58) Field of Classification Search
CPC ........ G06F 3/017; G06F 3/0304; G06F 3/011; G06F 3/042; G06F 3/04883; G06Q 30/0601
See application file for complete search history.

(56) References Cited

U.S. PATENT DOCUMENTS

| | | | |
|---|---|---|---|
| 5,022,170 A | 6/1991 | House | |
| 5,877,748 A | 3/1999 | Redlich | |
| 5,990,862 A | 11/1999 | Lewis | |
| 7,273,280 B2 | 9/2007 | Smoot et al. | |
| 7,519,223 B2 | 4/2009 | Dehlin et al. | |
| 7,982,724 B2 | 7/2011 | Hill | |
| 8,102,365 B2 * | 1/2012 | Alten | G06F 3/0304 345/156 |
| 8,373,657 B2 | 2/2013 | Hildreth | |

(Continued)

FOREIGN PATENT DOCUMENTS

| | | |
|---|---|---|
| CN | 101699387 B | 6/2014 |
| WO | 2005064439 | 7/2005 |
| WO | 2013108032 | 7/2013 |

*Primary Examiner* — Towfiq Elahi
(74) *Attorney, Agent, or Firm* — David Postolski, Esq.; Gearhart Law LLC

(57) ABSTRACT

Systems for providing an interactive window display are provided, wherein the system includes a source of light having a unique signature and a sensing mechanism having an ambient light filter, the sensing mechanism configured to detect at least one movement of at least one human appendage. The system further includes a means for interpreting the at least one movement operatively connected to a processor configured to execute a set of computer-readable instructions, the means including instructions for controlling images on an external screen, instructions for controlling at least one integrated object, and at least one instruction, wherein the at least one instruction indicates to a user how to operate the system.

15 Claims, 3 Drawing Sheets

(56) References Cited

U.S. PATENT DOCUMENTS

| | | | |
|---|---|---|---|
| 8,443,302 B2* | 5/2013 | Zhang | G06F 3/011 |
| | | | 345/158 |
| 8,791,800 B2 | 7/2014 | Ryhanen et al. | |
| 2005/0168448 A1 | 8/2005 | Simpson | |
| 2007/0130547 A1* | 6/2007 | Boillot | G06F 3/017 |
| | | | 715/863 |
| 2007/0220444 A1* | 9/2007 | Sunday | G06F 3/0488 |
| | | | 715/788 |
| 2008/0256494 A1 | 10/2008 | Greenfield | |
| 2010/0222110 A1* | 9/2010 | Kim | G06F 1/1616 |
| | | | 455/566 |
| 2011/0221676 A1 | 9/2011 | Liu | |
| 2011/0285666 A1 | 11/2011 | Poupyrev et al. | |
| 2012/0135247 A1 | 5/2012 | Lee et al. | |
| 2012/0235892 A1 | 9/2012 | Narendra et al. | |
| 2013/0057515 A1 | 3/2013 | Wilson | |
| 2013/0194240 A1 | 8/2013 | Kwong et al. | |
| 2014/0253432 A1 | 9/2014 | Ferguson | |
| 2018/0005005 A1* | 1/2018 | He | G06F 3/0412 |

\* cited by examiner

GLASS MOUSE

CLAIM OF PRIORITY

This application is a United States non-provisional application and claims priority to U.S. Provisional Patent Application No. 62/347,206, filed Jun. 8, 2016 and referenced herein in its entirety.

FIELD OF THE EMBODIMENTS

This invention relates to a system for providing an interactive window display for individuals who are walking past a storefront display.

BACKGROUND OF THE EMBODIMENTS

Glass-fronted stores on the street have been a feature of urban environments for centuries. As time has gone on, these displays have gotten larger, and have become more ubiquitous throughout retail. With this development of large plate glass surfaces, these displays, whether found on a storefront on a street, or in an indoor mall, have provided for a lot of direct communication between passersby and the store. Despite this golden opportunity to provide an interactive experience for passersby, the storefront remains a one-way street, displaying objects or images which a passerby can view, but not interact with. Given the explosion of computing devices making their way into many other industries, this lack of integration in the storefront seems puzzling.

There have been some isolated attempts to take advantage of this opportunity, that is, to exploit the opportunity to engage with a passerby. One way in which this is attempted is to place sensors outside the storefront window. These sensors are used to interpret user activity, and then provide an interactive experience. However, this approach results in the sensors being exposed to the elements, and leaves them vulnerable to vandalism. Further, there exist large technological and financial challenges with passing control data through or around the glass to interior computing devices, and the like.

Others have attempted to solve this problem by placing a special film on the inside of the glass and using a rear-projected image and capacitive or similar touch-sensing systems. While this seems like an attractive option, there are a number of drawbacks to this approach. First, users must physically touch the outside of the glass to engage the capacitive sensing technology. Further, the display image must be rear-projected onto the film, which is an inferior technology as the image quality suffers greatly and is adversely affected by sunlight and reflections on the glass itself. Moreover, the image cannot be displayed on a monitor which is inside the window, and is part of a closed system which is not connected to other aspects of the holistic window area, limiting the amount of interaction possible.

Examples of related art are described below:

E Display, Inc. offers a storefront window projection. The main element of this solution is a rear-projection film that can be mounted on any clear surface from inside to turn a store front window into a dynamic presentation screen. SSI Displays also offers a similar solution.

Screen Solutions International, through their website, offers another product where a transparent capacitive screen is attached to a controller. This screen may be retrofitted to a number of places, such as a television or window.

United States Patent Publication No.: 2016/0034108 pertains to system and method for operating a computer device using an interface device. The interface device includes at least one emitter of IR light/radiation with a peak intensity of between 780 nm and 1000 nm and at least one detector sensitive to IR light/radiation with a wavelength of 780 nm to 1000 nm wherein the user interface device is located adjacent to transparent, glass. The IR emitter directs IR radiation through the glass, wherein the IR radiation is reflected back through the glass to the IR detector and wherein the IR detector transforms the IR radiation into an electronic signal. The method includes the step of activating the detector from a front side of the glass. According to this implementation, the user must touch the glass directly.

None of the art described above addresses all of the issues that the present invention does.

Other solutions exist where a user's smartphone is used to control a standard screen set up in a window, however these solutions do not provide a responsive user interface where the user engages, directly and instantaneously, with their actions and the content on the screen.

SUMMARY OF THE EMBODIMENTS

According to an aspect of the present invention, a system for providing an interactive window display is provided, wherein the system includes a source of light having a unique signature and a sensing mechanism having an ambient light filter, the sensing mechanism configured to detect at least one movement of at least one human appendage. The system further includes a means for interpreting the at least one movement operatively connected to a processor configured to execute a set of computer-readable instructions, the means including instructions for controlling images on an external screen, instructions for controlling at least one integrated object, and at least one instruction, wherein the at least one instruction indicates to a user how to operate the system.

According to another aspect of the present invention, a system for providing an interactive window display is provided. The system includes a source of light having a unique signature, a plurality of sensing mechanisms having an ambient light filter, the sensing mechanism configured to detect at least one movement of at least one human appendage, and a transparent medium onto which the plurality of sensing mechanisms is coupled. The system further includes a means for interpreting the at least one movement operatively connected to a processor configured to execute a set of computer-readable instructions, the means including instructions for controlling images on an external screen, instructions for controlling at least one integrated object and at least one instruction, wherein the at least one instruction indicates to a user how to operate the system.

According to an embodiment, the user has the capability of controlling one or more of motorized displays, lights, the movement of images on a display, etc.

It is an object of the present invention to provide the system for providing an interactive window display, wherein the sensing mechanism is a camera.

It is an object of the present invention to provide the system for providing an interactive window display, wherein the sensing mechanism is configured to sense the at least one movement through a transparent medium.

It is an object of the present invention to provide the system for providing an interactive window display, wherein the transparent medium is glass.

It is an object of the present invention to provide the system for providing an interactive window display, wherein the screen is directly coupled to the transparent medium.

It is an object of the present invention to provide the system for providing an interactive window display, wherein the screen is separated from the transparent medium by a distance.

It is an object of the present invention to provide the system for providing an interactive window display, wherein the system includes a plurality of sensing mechanisms.

It is an object of the present invention to provide the system for providing an interactive window display, wherein the plurality of sensing mechanisms includes at least one light emitter and at least one reflection-sensing photocell.

It is an object of the present invention to provide the system for providing an interactive window display, wherein the at least one movement of the at least one human appendage is associated with a particular instruction.

It is an object of the present invention to provide the system for providing an interactive window display, wherein the plurality of sensing mechanisms includes one or more cameras.

DESCRIPTION OF THE PREFERRED EMBODIMENTS

Figure 1:
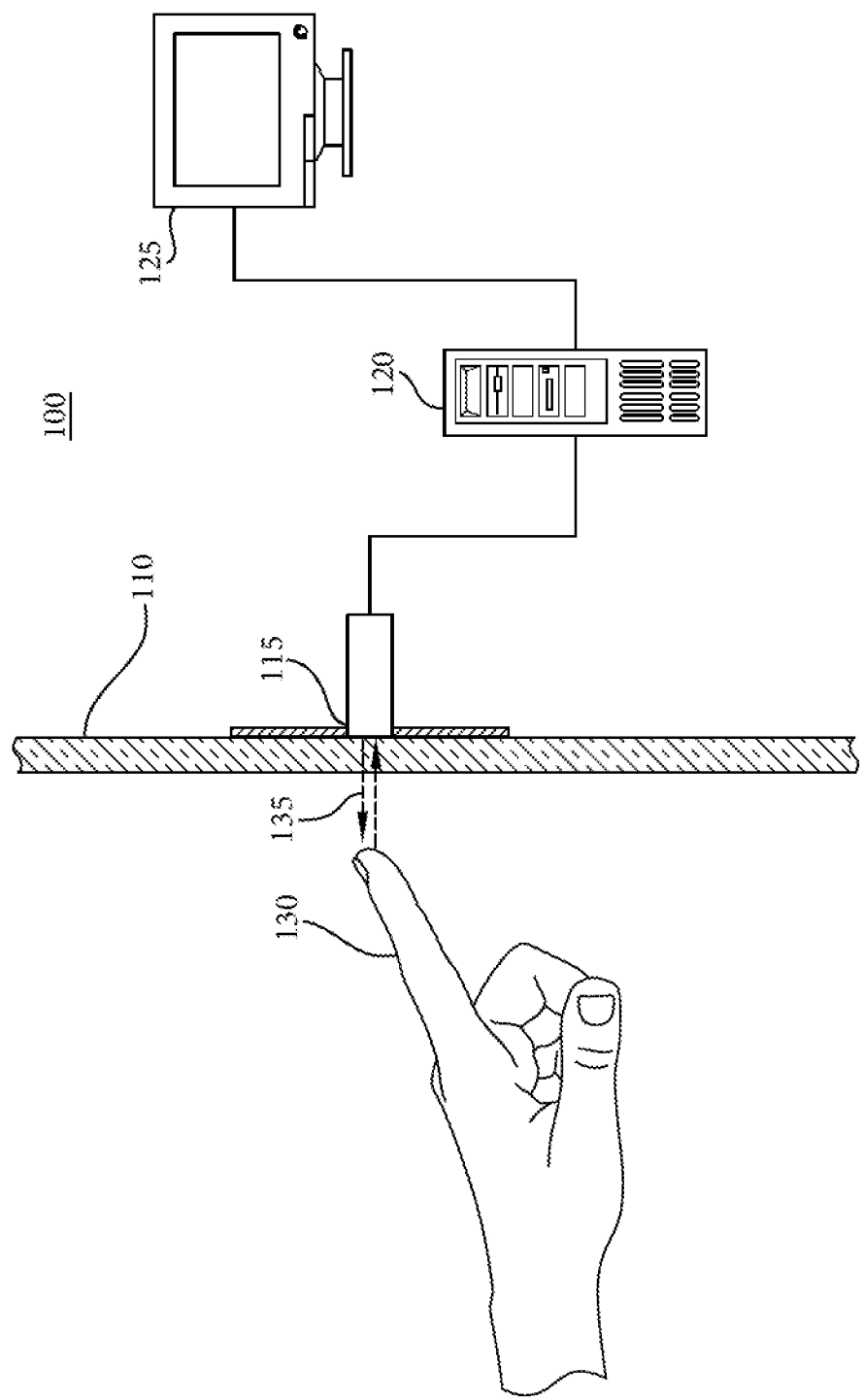
FIG. 1 shows a side view of an interactive system, according to an embodiment of the present invention.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

Referring now to FIG. 1, an interactive system 100 is illustratively depicted, in accordance with an embodiment of the present invention.

According to an embodiment, the system 100 includes a window or other transparent medium 110, visual sensors 115 located within the window 110, a computing device 120 coupled to the visual sensors 115, and a display screen 125 coupled to the computing device 120.

According to an embodiment, system permits users 130 who are outside a glass-fronted store window 110 to control images displayed on a computer screen 125 located on the side of the window 110 opposite the user 130. The users' 130 gestures and/or body movements are detected and interpreted by sensors. The sensors may be coupled to the window 110 and/or wholly located on the inside of the window 110.

According to an embodiment, the computing device 120 includes at least one processor and memory and is configured to execute a set of computer-readable instructions, which include instructions for controlling images on an external screen 125, and instructions for controlling at least one integrated object. According to an embodiment, the computing device includes at least one instruction, wherein the at least one instruction indicates to a user how to operate the system. According to an embodiment, the at least one movement of the at least one human appendage is associated with a particular instruction According to an embodiment, no sensors 115 and/or other equipment are positioned on the outside of the window 110 on the side of the window 110 in which the user 130 is positioned. This configuration enables users 130 to interact with the system 100 without touching the glass of the storefront window 110. In this way, the user 130 can move from "viewer" to "participant," and engage in a more meaningful interaction with the goods or services provided by the store owner. Not however limited to the goods and services provided by the store owner or lessee, as any goods or services can be "advertised" using this system, so the owner/lessee can profit by having the store window as "street real estate" to be used in any way they see fit.

According to an embodiment, the user has the capability of controlling one or more of motorized displays, lights, the movement of images on a display, etc.

According to an embodiment, the system 100 is capable of sending back ordinary non-proprietary instructions to the computing device 120, so that anyone can implement the interaction as they see fit. For example, according to an embodiment, simulated keystrokes may be sent back to the computing device 120 which can be used by any programmer to effect visual changes.

According to an embodiment, the display screen 125 is against the window 110. According to another embodiment, the display screen 125 is projected onto the window 110. According to yet another embodiment, the display screen 125 is at a not up against the window 110 or projected on the window 110 and is at a distance from the window 110, as is shown in FIG. 1. In contrast to the existing methods of "touch screen" interaction for storefront windows, the proposed invention disassociates the area of user gesture control from the plane of the image displayed on the display 125. This provides flexibility to the designer of the interactive experience to be able to position the images or objects to be controlled anywhere in the space of the inner window area, and on any size screen on the display 125.

While the present system 100 may be installed in a number of locations, preferable locations include, but are not limited to: a streetscape, a mallscape, a museum interior, proximate to museum exhibits, incorporated into museum exhibits, dioramas, etc. Further, the present invention can enable store owners to advertise a variety of products, or advertise a cycle of individual products, giving users the ability to control the content on the display 125.

In a preferred embodiment, the present invention provides a means to offer two-way communication. In these circumstances, storefronts could also provide entertainment to passersby such as, but not limited to, interactive games, educational experiences, news feeds, location information, and other related services. Users can engage with images and other controllable physical and virtual display elements from outside the display.

According to an embodiment, the sensors 115 use structured light as the medium of sensing a user's gestures. This structured light may have a wavelength in the visible or infrared spectrum, but it may also contain light in other regions of the electromagnetic spectrum. This allows the structured light to pass through a pane of glass 110 (or other material) and be reflected back through the glass 110 to the sensor 115 with little degradation. By "structured" light, it is meant that the light is modulated to add a "signature" to it. These methods substantially improve the ability of the sensor 115 to determine that light coming back from the outside of the glass 110 is the same light that was transmitted from inside the glass 110 by the sensor 115 system, as opposed to ambient light from other sources like sunlight, exterior lights, or reflections. It is noted, however, that other types of sensors may also be used while maintaining the spirit of the present invention.

This structuring of light can be achieved by different methods. Such methods include restricting the wavelength of light to specific ranges, restricting the wavelength of light to a particular frequency, and/or and pulsing the light with a given modulation pattern. In the case of wavelength restriction, for example, the source light of the sensor system is generated as monochromatic light or dichomatic light, where this light is in a very narrow wavelength band. In those embodiments, the sensor 115 is tuned to that wavelength in particular, and ignores other wavelengths that may enter through the window 110. This can be achieved using one or more filters or through other, not explicitly stated methods.

In alternative embodiments, the light of the present invention is pulsed or modulated in a unique way. For example, the light could be displayed in a series of very rapid bursts or displayed in another particular pattern. Preferably, the sensor of the present invention is electronically tuned to detect incoming reflected light from outside the glass that matches the light patterns emanating from the source. This method effectively screens out stray light coming from the outside, which does not possess the signature patterns, and focuses the sensor 115 system only on its source's light emanations. Thus the source/sensor system can very accurately focus on and determine the specific actions of the nearby user 130, while also ignoring any extraneous light sources as well as light generated by reflections from nearby objects, as distinguished from reflections of the structured light source. One way in which these reflections would be distinguishable would be the strength of the reflection. That is, the reflections of the structured light would be orders of magnitude stronger than that of the ambient light.

Figure 2:
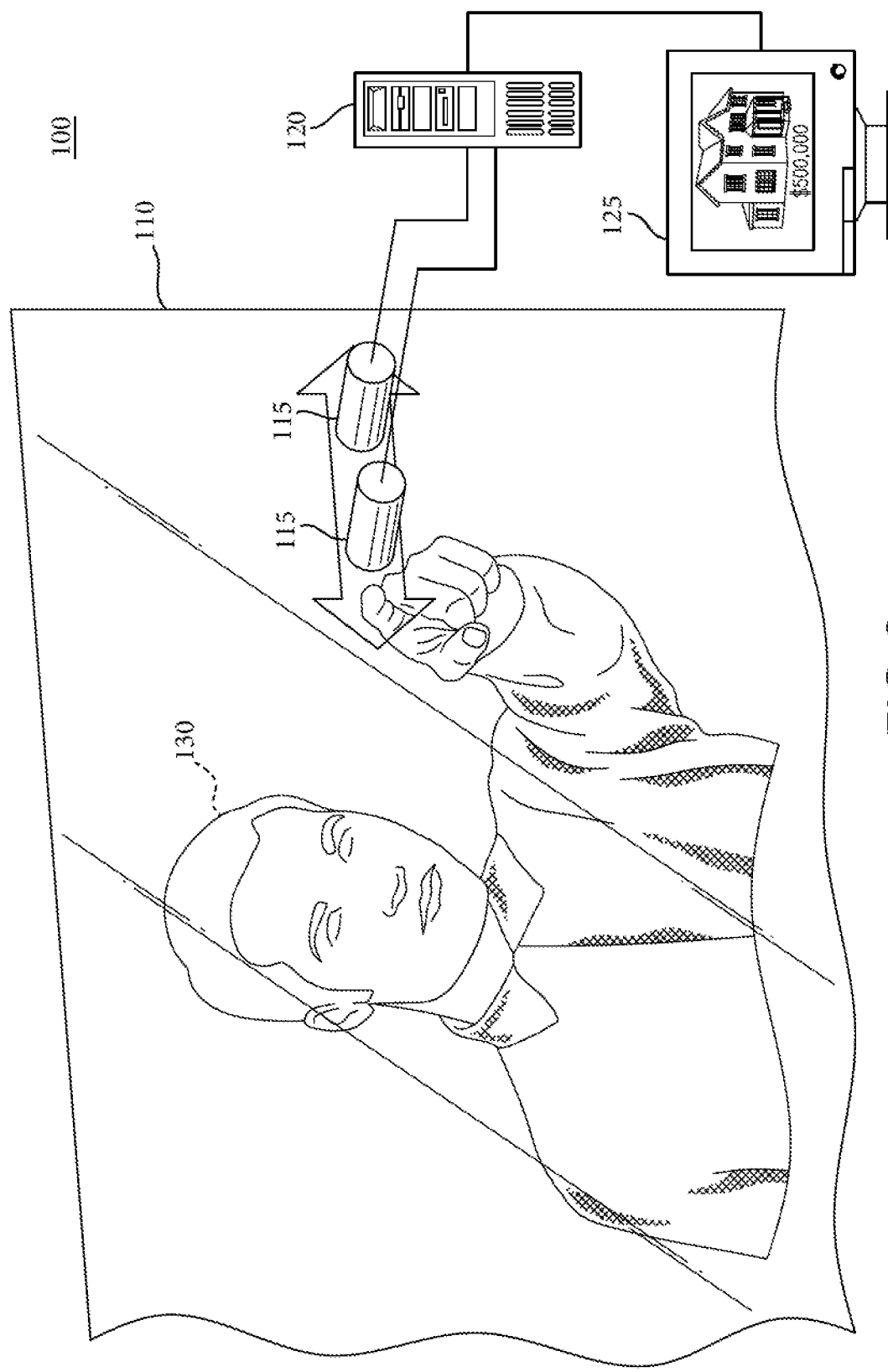
FIG. 2 is a rear perspective view of an interactive system while in use by a human user, according to an embodiment of the present invention.
Figure 3:
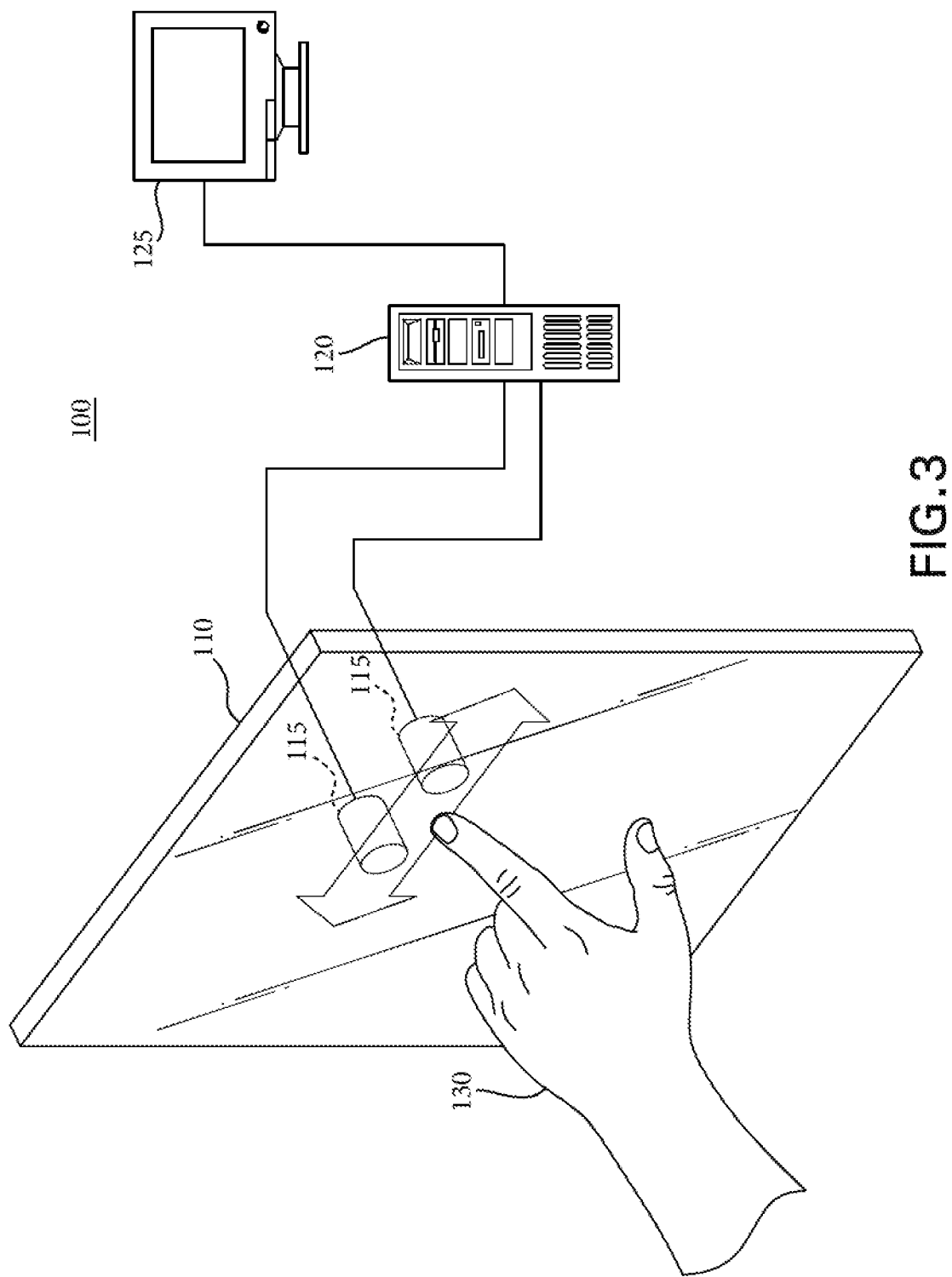
FIG. 3 is a front perspective view of an interactive system, according to an embodiment of the present invention.

Referring now to FIGS. 2-3, a rear perspective view (FIG. 2) and a front perspective view (FIG. 3) of an interactive system 100, while in use by a human user 130, are illustratively depicted, in accordance with various embodiments of the present invention.

In one embodiment of the present invention, multiple light emitters and reflection-sensing photocells 115 are used. In this configuration, the present invention is able to determine whether a user's 130 finger is near a particular area. For example, this area may correspond to standard ways of controlling a computer, as one does using a keyboard or mouse. The decals on the inside of the glass help guide the user toward these zones. In some embodiments, there are five zones which correspond to left, right, up, down, and select. Decals are a preferable choice as many types of light generated by the sensors 115 can pass through a decal uninhibited, making it possible to provide simple and direct graphical instruction for the user without degrading the sensing system.

In another preferred embodiment, a standard or infrared camera 115 (acting as the sensor 115) is placed behind the glass 110, facing the outside of the display. The system 100 layers "structure" and "signature" on the lighting 135 (shown in FIG. 1) which emanates from inside the store window 110, such that that the camera is made to focus only on the nearby user 130, and not the background imagery of other passerbys, cars or other moving objects. This greatly improves the ability of the present invention to "focus" on the important aspects of the user's movements. In this embodiment, the light signal sensed by the camera can be modulated electronically using the structuring methods outlined above.

In yet another preferred embodiment, in addition to the present invention controlling images and menu choices on an external screen, the present invention also contemplates integrated "animatronic" assemblages of physical objects, equipped with motors controlling their movements. In this embodiment, users would be able to activate a variety of movements and actions of these components using finger, hand or body gestures.

The present invention improves upon the prior art by only placing its sensing devices against the glass 110 (or other material), and then communicates to a screen 125 which can be located anywhere inside the storefront. This greatly enhances the visibility of the screen 125, and affords a designer greater flexibility in designing the display 125, due in part to the ability to place the screen 125 at any location. Further, the present invention uses different methods of applying a "signature" to the light source, so that it is not restricted to infrared frequencies. Additionally, the present invention alternatively uses a camera to track the shape of a user's 130 appendage and its movements. Further, the present invention does not require that the user touch the glass, which is a large departure from the teachings of the prior art, which often mandates that the glass be directly contacted by a user.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A system for providing an interactive window display, the system comprising:
   a transparent medium;
   a source of light configured to pass through the transparent medium and having a unique signature generated by pulsing the source of light with a given modulation pattern;
   visual sensors located within the transparent medium and having an ambient light filter, wherein the visual sensors are configured to:
      detect a first reflection of light and a second reflection of light from a location outside of the transparent medium;
      in response to comparing a signature and a wavelength of the first reflection of the light to the unique signature and a wavelength of the source of light,
         identifying a match between the signature and the wavelength of the first reflection of the light with the unique signature and the wavelength of the source of light;
         determining the first reflection of the light as being a reflection of the source of light; and
         detecting, via the first reflection of the light, at least one movement of at least one human appendage of a user, wherein the at least one movement of the at least one human appendage occurs without the user touching the transparent medium when the user is located outside of the transparent medium; and in response to comparing a signature and a wavelength of the second reflection of the light to the unique signature and the wavelength of the source of light, failing to identify the match between the signature and the wavelength of the second reflection of the light with the unique signature and the wavelength of the source of light;

determining the second reflection of the light to be associated with ambient light; and filtering, via the ambient light filter, the second reflection of the light;

a display screen coupled to a computing device and located inside of the transparent medium; and the computing device, including a processor and coupled to the visual sensors, wherein the computing device is configured to:

interpret the at least one movement;

control images on the display screen;

control at least one integrated object; and enable the user to operate the system.

2. The system as recited in claim 1, wherein the visual sensors comprise a camera.

3. The system as recited in claim 1, wherein the transparent medium is glass.

4. The system as recited in claim 1, wherein the display screen is directly coupled to the transparent medium.

5. The system as recited in claim 1, wherein the display screen is separated from the transparent medium by a distance.

6. The system as recited in claim 1, wherein the system includes a plurality of sensing mechanisms.

7. The system as recited in claim 6, wherein the plurality of sensing mechanisms includes at least one light emitter and at least one reflection-sensing photocell.

8. The system as recited in claim 1, wherein the at least one movement of the at least one human appendage is associated with a particular function of the computing device.

9. A system for providing an interactive window display, the system comprising:

a transparent medium;

a source of light configured to pass through the transparent medium and having a unique signature generated by pulsing the source of light with a given modulation pattern;

visual sensors located within the transparent medium and having an ambient light filter, wherein the visual sensors are configured to:

detect a first reflection of light and a second reflection of light from a location outside of the transparent medium;

in response to comparing a signature and a wavelength of the first reflection of the light to the unique signature and a wavelength of the source of light, identifying a match between the signature and the wavelength of the first reflection of the light with the unique signature and the wavelength of the source of light;

determining the first reflection of the light as being a reflection of the source of light; and detecting, via the first reflection of the light, at least one movement of at least one human appendage of a user, wherein the at least one movement of the at least one human appendage occurs without the user touching the transparent medium when the user is located outside of the transparent medium; and in response to comparing a signature and a wavelength of the second reflection of the light to the unique signature and the wavelength of the source of light, failing to identify the match between the signature and the wavelength of the second reflection of the light with the unique signature and the wavelength of the source of light;

determining the second reflection of the light to be associated with ambient light; and filtering, via the ambient light filter, the second reflection of the light;

a display screen coupled to a computing device and located inside of the transparent medium; and the computing device including a processor and coupled to the visual sensors, wherein the computing device is configured to:

interpret the at least one movement;

control images on the display screen;

control at least one integrated object; and enable the user to operate the system.

10. The system as recited in claim 9, wherein the visual sensors comprise one or more cameras.

11. The system as recited in claim 9, wherein the display screen is directly coupled to the transparent medium.

12. The system as recited in claim 9, wherein the display screen is separated from the transparent medium by a distance.

13. The system as recited in claim 9, wherein the transparent medium is glass.

14. The system as recited in claim 9, wherein the visual sensors comprise at least one light emitter and at least one reflection-sensing photocell.

15. The system as recited in claim 9, wherein the at least one movement of the at least one human appendage is associated with a particular function of the computing device.

* * * * *